(12) United States Patent  (10) Patent No.: US 11,782,780 B2
Purushothaman  (45) Date of Patent: Oct. 10, 2023

(54) AUTOMATIC REMEDIATION OF FAILURES WITHIN A COMPUTATIONAL ENVIRONMENT USING INDEPENDENT EXECUTION UNITS

(71) Applicant: BANK OF AMERICA CORPORATION, Charlotte, NC (US)

(72) Inventor: Sasidhar Purushothaman, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 48 days.

(21) Appl. No.: 17/554,129

(22) Filed: Dec. 17, 2021

(65) Prior Publication Data

US 2023/0195550 A1   Jun. 22, 2023

(51) Int. Cl.
*G06F 11/07*   (2006.01)
*G06N 20/00*   (2019.01)
*G06F 9/50*   (2006.01)

(52) U.S. Cl.
CPC .......... *G06F 11/0757* (2013.01); *G06F 9/505* (2013.01); *G06F 11/0706* (2013.01); *G06N 20/00* (2019.01)

(58) Field of Classification Search
CPC .. G06F 11/0757; G06F 11/0706; G06F 9/505; G06N 20/00
See application file for complete search history.

(56) References Cited

U.S. PATENT DOCUMENTS

| 7,076,400 | B2 | 7/2006 | Dulberg et al. |
| 7,409,318 | B2 | 8/2008 | Dulberg et al. |
| 7,542,877 | B2 | 6/2009 | Nakamura |
| 7,761,745 | B2 | 7/2010 | Garbow |
| 8,751,421 | B2 | 6/2014 | Anderson et al. |

(Continued)

FOREIGN PATENT DOCUMENTS

EP   4075297 A1 * 10/2022   ......... G06F 3/04842

OTHER PUBLICATIONS

Sasidhar Purushothaman; U.S. Appl. No. 17/554,045; System and Method for Continuous Failure Prediction and Remediation Within a Computational Environment Using Independent Execution Units, filed Dec. 17, 2021.

*Primary Examiner* — Matthew M Kim
*Assistant Examiner* — Kyle Emanuele (57) ABSTRACT

A system includes a computer system, memory, and processor. The computer system includes active units of system resources, each executing a workload unit, and redundant units of system resources. The memory stores a reinforcement learning algorithm configured to generate a sequence of resets. Executing each reset includes exchanging the active unit of system resources associated with the reset with a redundant unit of system resources assigned to the active unit of system resources. The processor measures performance metric values, and determines, based on the values, that a first probability that a failure will occur is greater than a threshold. In response, the processor generates and executes a sequence of resets. The processor measures new performance metric values, and determines, based on the new values, a second probability that the failure will occur. The processor then updates the reinforcement learning algorithm based on a difference between the first and second probabilities.

20 Claims, 5 Drawing Sheets

(56) References Cited

U.S. PATENT DOCUMENTS

| | | |
|---|---|---|
| 9,317,829 B2 | 4/2016 | Anand et al. |
| 9,462,493 B2 | 6/2016 | Watanabe |
| 9,542,296 B1 | 1/2017 | Engers et al. |
| 9,774,522 B2 | 9/2017 | Vasseur et al. |
| 9,787,858 B2 | 10/2017 | Sato et al. |
| 9,916,194 B2 | 3/2018 | Pang |
| 10,090,798 B2 | 10/2018 | Watanabe et al. |
| 10,471,597 B1 | 11/2019 | Murphy et al. |
| 10,585,737 B2 | 3/2020 | Chakra et al. |
| 10,613,962 B1 | 4/2020 | Delange |
| 10,618,202 B2 | 4/2020 | Maruyama |
| 10,657,232 B2 | 5/2020 | Kodama et al. |
| 10,726,930 B2 | 7/2020 | Sarkar et al. |
| 10,802,930 B2 | 10/2020 | Rinaldi et al. |
| 10,922,164 B2 | 2/2021 | Venkataraman et al. |
| 10,970,187 B2 | 4/2021 | Schornack |
| 10,984,352 B2 | 4/2021 | Chakra et al. |
| 11,012,289 B2 | 5/2021 | Singh et al. |
| 11,087,234 B2 | 8/2021 | Feng et al. |
| 11,113,144 B1 | 9/2021 | Gadepalli et al. |
| 11,121,954 B2 | 9/2021 | Vasseur et al. |
| 2010/0332661 A1 | 12/2010 | Tameshige |
| 2016/0266962 A1* | 9/2016 | Rajasekharan ....... H04L 41/142 |
| 2017/0344909 A1 | 11/2017 | Kurokawa et al. |
| 2018/0285596 A1 | 6/2018 | Jones et al. |
| 2018/0247210 A1 | 8/2018 | Chakra et al. |
| 2019/0042353 A1 | 2/2019 | Ahad |
| 2020/0133820 A1 | 4/2020 | Olson et al. |
| 2020/0198128 A1 | 6/2020 | Hatanaka |
| 2020/0226222 A1 | 7/2020 | Jayaraman et al. |
| 2020/0322367 A1 | 10/2020 | Salvat Lozano et al. |
| 2020/0410284 A1 | 12/2020 | Kallanagoudar et al. |
| 2021/0049092 A1 | 2/2021 | Kochura et al. |
| 2021/0110279 A1 | 4/2021 | Chakra et al. |
| 2021/0157665 A1 | 5/2021 | Rallapalli et al. |
| 2021/0336871 A1 | 10/2021 | Vasseur et al. |

\* cited by examiner

AUTOMATIC REMEDIATION OF FAILURES WITHIN A COMPUTATIONAL ENVIRONMENT USING INDEPENDENT EXECUTION UNITS

TECHNICAL FIELD

The present disclosure relates generally to error detection/correction and fault detection/recovery, and more particularly, to automatic remediation of failures within a computational environment using independent execution units.

BACKGROUND

Many organizations rely on software systems to support their regular operations. Failures within such systems are thus highly undesirable as they may result in interrupted processes, data loss, and halted operations. In an attempt to avoid such failures, organizations often provision their software systems with redundant computational resources, which may take over control of software execution within the system, when an issue occurs within the primary resources. However, because computational resources are finite, if there is an inherent problem in the software execution and/or computational infrastructure, itself, any amount of redundancy provided will eventually run out.

SUMMARY

This disclosure contemplates a failure identification and prevention tool that is configured to automatically remediate potential failures within a computer system, before such failures materialize. In particular, the tool uses a pair of machine learning algorithms to continuously monitor and adjust the environment of the computer system environment to prevent system failures. The first machine learning algorithm is designed to identify potential failures, while the second machine learning algorithm is designed to adjust the computer system environment to prevent the potential failures from occurring. This is accomplished by dividing the resources of the computer system (e.g., processing resources, memory resources, etc.) and the workload executing on the computer system into a set of independent execution units, each provided with a level of redundancy within the environment. Performance metrics may then be measured for each independent execution unit, in order to identify potential failures, and resets of the independent execution units (during which active execution of the workload unit is transferred to a redundant unit of system resources) may be performed to automatically prevent an identified potential failure. By automatically identifying and preventing failures of the computer system, certain embodiments of the tool conserve the computational resources that would otherwise be wasted as a result of such failures. Certain embodiments of the tool are described below.

According to an embodiment, a system includes a computer system, a memory, and a hardware processor communicatively coupled to the memory. The computer system includes system resources that execute a workload. The workload is divided into a plurality of workload units. The computer system includes a plurality of units of system resources. Each unit of system resources of the plurality of units of system resources executes a workload unit of the plurality of workload units. The memory stores a set of remediation scripts. Each remediation script is associated with a known failure of a set of known failures within the computer system. Each remediation script is configured, when executed, to remediate the known failure. The hardware processor measures first values for a set of performance metrics associated with the computer system. The set of performance metrics includes, for each unit of system resources of the plurality of units of system resources, one or more metrics associated with a performance of the unit of system resources and one or more metrics associated with a performance of the workload unit executing on the unit of system resources. The hardware processor also determines, based on the first values for the set of performance metrics, that a first probability that a first failure within the computer system will occur within a first future time is greater than a set threshold. In response to determining that the first probability is greater than the set threshold, the processor additionally determines, based on the first values for the set of metrics, that the first failure is a known failure of the set of known failures within the computer system. In response to determining that the first failure is the known failure, the processor further executes the remediation script associated with the known failure.

According to another embodiment, a system includes a computer system, a memory, and a hardware processor communicatively coupled to the memory. The computer system includes system resources that execute a workload. The workload is divided into a plurality of workload units. The system resources include a plurality of units of system resources including a plurality of active units of system resources and a plurality of redundant units of system resources. Each workload unit of the plurality of workload units is assigned to an active unit of system resources of the plurality of active units of system resources. The assigned active unit of system resources executes the workload unit. Each redundant unit of system resources of the plurality of redundant units of system resources is assigned to an active unit of system resources of the plurality of active units of system resources. The memory stores a reinforcement learning algorithm that is configured to generate a sequence of resets for execution within the computer system, based on values for a set of performance metrics associated with the computer system. Each reset of the sequence of resets is associated with a particular workload unit executing on a given active unit of system resources of the plurality of active units of system resources. Executing the reset includes exchanging the given active unit of system resources with the redundant unit of system resources assigned to the given active unit of system resources, at least in part by transferring active execution of the particular workload unit from the given active unit of system resources to the redundant unit of system resources assigned to the given active unit of system resources. For each active unit of system resources of the plurality of active units of system resources, the set of performance metrics includes one or more metrics associated with a performance of the active unit of system resources and one or more metrics associated with a performance of the workload unit executing on the active unit of system resources. The processor measures the values for the set of performance metrics associated with the computer system. The processor also determines, based on the values for the set of performance metrics, that a first probability that a first failure within the computer system will occur within a first future time is greater than a set threshold. In response to determining that the first probability is greater than the set threshold, the processor executes the reinforcement learning algorithm to generate the sequence of resets for the computer system. The processor also executes each reset of the sequence of resets. The processor additionally measures new values for the set of performance metrics associated with the computer system. The processor also determines, based on the new values for the set of performance metrics, a second probability that the first failure within the computer system will occur within the first future time. The processor further updates the reinforcement learning algorithm based on a difference between the first probability and the second probability.

The tool described in the present disclosure may be integrated into a practical application of a failure prevention tool, which monitors a computational environment and proactively takes action to prevent failures from occurring within the environment, thereby avoiding unnecessary system downtime, data loss, and any other undesirable consequences of a system failure. As used throughout this disclosure, a failure corresponds to any error or condition within a computer system that may cause the system (and/or application(s) executing on the system) to freeze and/or crash. For example, a failure may correspond to a memory leak, an improper distribution of computational resources (e.g., leading to a process attempting to use more CPU power, RAM, and/or storage than available to it), a memory access error (e.g., a segmentation fault), a buffer overflow error, and/or any other error/condition that may cause the system (and/or application(s) executing on the computer system) to freeze and/or crash. Such failures may lead to unnecessary system and/or application downtime, during which the system may need to be rebooted and/or application(s) may need to be restarted. Furthermore, processes that were halted mid-execution may need to be restarted and data generated by such processes may be lost. Accordingly, by preventing failures from occurring within a computational environment, certain embodiments may conserve the computational resources that would otherwise be expended on rebooting the system and/or restarting applications running within the system. Furthermore, by automatically attempting to remediate even unknown failures, for which remediation scripts have not yet been developed, certain embodiments of the tool may prevent or at least sufficiently delay a potential failure from occurring within a computational environment, such that a system administrator may address the potential failure before it occurs.

Certain embodiments may provide one or more technical advantages. As an example, an embodiment conserves the computational resources that would otherwise be wasted as a result of a need to reboot the system after a system crash caused by a system failure. In particular, certain such embodiments may conserve the computational resources associated with reinitializing applications and processes within the system, which were halted as a result of the system crash. As another example, an embodiment iteratively applies a pair of machine learning algorithms to both identify potential failures within the system and to remediate identified potential failures, thereby helping to prevent the system (and/or application(s) executing on the system) from crashing. As another example, an embodiment divides both the computational resources and the workload to be executed within a computational environment into a set of smaller units, enabling the system performance to be probed at a fine grain scale. In this manner, the computational and/or workload units associated with a potential failure may be identified and resets of those units may be performed. Thus, certain embodiments enable remediation of potential failures within the system in a computationally efficient manner, without wasting the computational resources associated with a full system restart. As another example, an embodiment automatically identifies and executes remediation scripts that have previously been developed to remediate known issues, without needing to inform a system administrator of an impending failure. In this manner, certain embodiments leverage prior knowledge of remediation methods to automatically prevent system crashes from occurring where the system is able to do so, rather than relying on a system administrator who may not be able to direct his/her attention to the identified issues before they materialize and cause the system to crash. As a further example, an embodiment automatically executes a sequence of resets of certain portions of computational resources within the computational environment, in an attempt to automatically remediate an unknown potential failure, thereby preventing the system from crashing. Thus, certain embodiments reduce the amount of time during which a computational system is unavailable, and conserve the computational resources otherwise associated with rebooting/restarting the system after a system crash. In particular, the embodiment uses a reinforcement learning algorithm to learn which resets improve the system, thereby potentially avoiding or at least delaying system failures until they can otherwise be addressed.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages may be understood by referring to FIGS. 1 through 4 of the drawings, like numerals being used for like and corresponding parts of the various drawings.

System Overview

Figure 1:
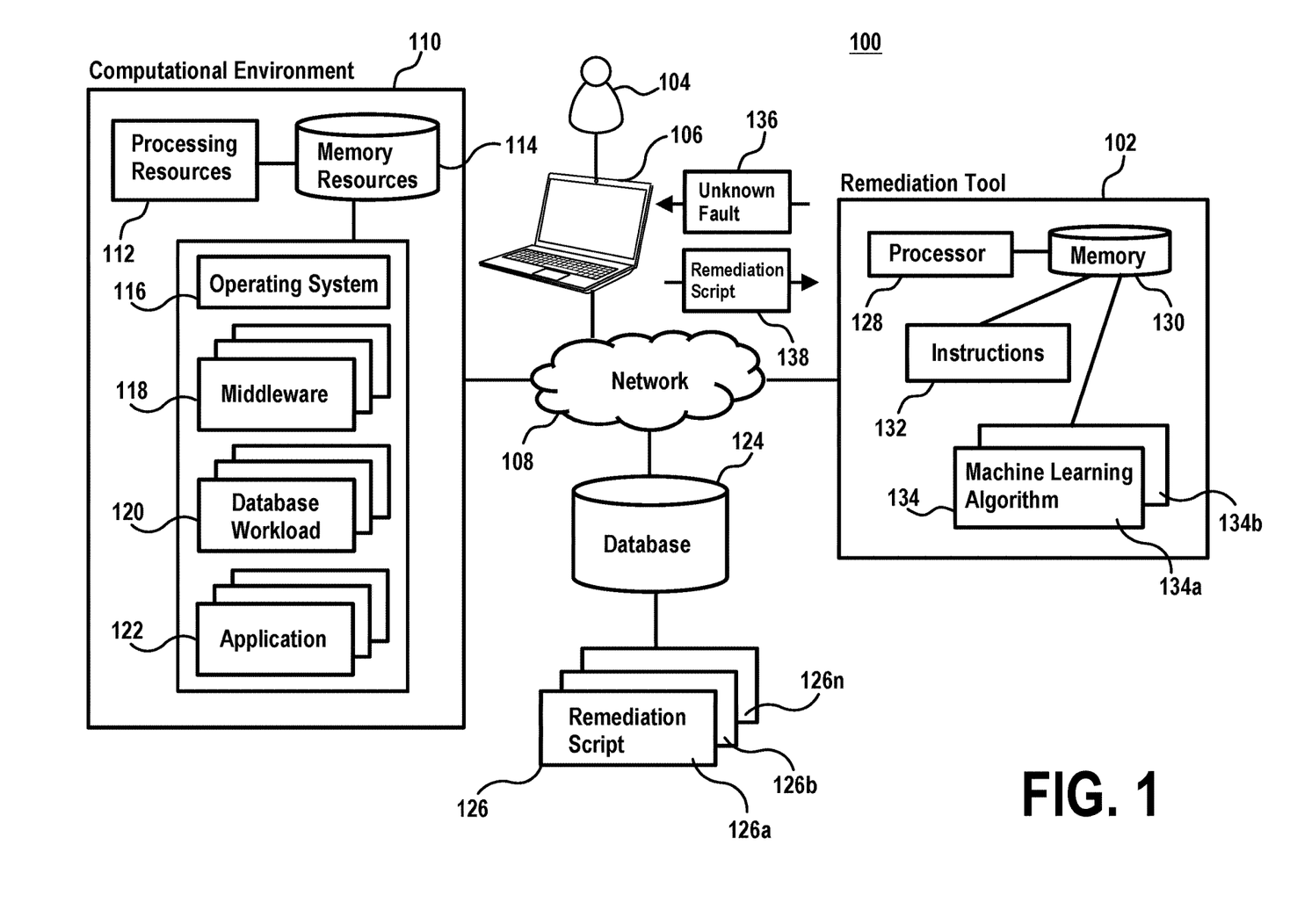
FIG. 1 illustrates an example failure identification and prevention system.

FIG. 1 illustrates an example failure identification and prevention system 100 that includes user(s) 104, device(s) 106, network 108, computational environment 110, database 124, and failure identification and prevention tool 102. As illustrated in FIG. 1, computational environment 110 is associated with system resources that include processing resources 112 and memory/storage resources 114. Together, processing resources 112 and memory/storage resources 114 are configured to execute a computational workload that includes operating system workload 116, middleware workload 118, database workload 120, and application workload 122. In the context of this disclosure, a failure corresponds to any unexpected/undesirable condition occurring within computational environment 110, which may cause downtown within the environment, thereby rendering the environment incapable of supporting all or a portion of its normal operations (e.g., incapable of executing all or a portion of operating system workload 116, middleware workload 118, database workload 120, and/or application workload 122).

In general, failure identification and prevention tool 102 operates to prevent failures from occurring within computational environment 110 by: (1) monitoring a set of performance metrics for computational environment 110, (2) predicting, based on the set of performance metrics, a probability that a future failure within computational environment will occur within a future time, (3) in response to determining that the probability that the predicted failure will occur within the future time is greater than a threshold, classifying the predicted failure as either (a) one of a set of known failures within the computational environment, or (b) an unknown failure, and (4) attempting to remediate the system to avoid the predicted failure, based on the classification of the failure. In particular, in response to classifying a predicted failure as a specific known failure, failure identification and prevention tool 102 is configured to execute a remediation script 126, which has been designed to address the known failure, as described in further detail below and in the discussion of FIG. 3. In response to classifying a predicted failure as an unknown failure, in certain embodiments, failure identification and prevention tool 102 is configured to transmit a request 136 to an administrator 104, requesting that the administrator manually investigate computational environment 110 and attempt to remediate the predicted failure, as described in further detail below and in the discussion of FIG. 3. In some embodiments, in response to classifying a predicted failure as an unknown failure, failure identification and prevention tool 102 is configured to automatically attempt to prevent the failure, by executing a sequence of resets within computational environment 110, as described in further detail below and in the discussion of FIG. 4.

Device(s) 106 are used by user(s) 104 (e.g., system administrators) to communicate with failure identification and prevention tool 102. For example, device 106 may be configured to receive messages 136 alerting administrator 104 to unknown failures predicted to occur within computational environment 110. In the context of this disclosure, an unknown failure corresponds to any issue within computational environment 110 for which a remediation script is not available within the set of remediation scripts 126. In certain embodiments, messages 136 include information that may aid administrator 104 in remediating computational environment 110 in order to prevent the unknown failures. For example, messages 136 may include a time-series of values for a set of performance metrics evaluated for computational environment 110. Such performance metrics may include metrics associated with usage of computational resources (e.g., CPU, RAM, storage, etc.) within computational environment 110, metrics associated with errors, warnings, and/or alerts generated within computational environment 110 (e.g., application error codes, page faults, etc.), and/or metrics associated with any other suitable performance parameters measured/observed within computational environment 110. In some embodiments, device 106 may be configured to display the performances metrics to user 104. For example, device 106 may be configured to display a dashboard in which the performance metrics may be displayed.

In certain embodiments, devices 106 may be used by system administrators 104 to transmit remediation scripts 138 to failure identification and prevention tool 102 for storage in database 124. For example, in response to receiving message 136 alerting administrator 104 to a predicted unknown failure within computational environment 110, administrator 104 may identify the cause of the predicted failure, remediate the cause, generate a script that may be executed in the future should a similar issue arise, and transmit the script to failure identification and prevention tool 102 and/or database 124, for storage within database 124.

Devices 106 include any appropriate device for communicating with components of system 100 over network 108. For example, devices 106 may include a mobile phone, a computer, a laptop, a wireless or cellular telephone, a tablet, a server, an IoT device, and/or an automated assistant, among others. This disclosure contemplates devices 106 being any appropriate device for sending and receiving information over network 108, and/or displaying information (e.g., performance metrics) received from failure identification and prevention tool 102. In some embodiments, device 106 may include a display, a keypad, or other appropriate terminal equipment usable by user 104. In some embodiments, an application executed by a processor of device 106 may perform the functions described herein.

Network 108 facilitates communications between components of system 100 including, for example, failure identification and prevention tool 102, devices 106, computational environment 110, and database 126. Network 108 may include any interconnecting systems capable of transmitting audio, video, signals, data, messages, or any combination of the preceding. For example, network 108 may include all or a portion of a public switched telephone network (PSTN), a public data network, a metropolitan area network (MAN), a wide area network (WAN), a local, regional, or global communication or computer network, such as the Internet, a wireline or wireless network, or any other suitable communication link, including combinations thereof, operable to facilitate communication between components of system 100.

Computational environment 110 corresponds to any computer system that includes a set of system resources (e.g., processing resources 112 and memory resources 114), along with a workload executing on the system resources. System resources (e.g., processing resources 112 and/or memory resources 114) may include any suitable hardware and/or software components configured to execute workload components 116 through 122. As an example, system resources 112/114 may include an application server (e.g., J2EE, Glassfish, Apache Tomcat, Apache Geronimo, etc.), a database server (e.g., SQL, Oracle, DB2, etc.), and/or any other suitable computational resources.

As illustrated in FIG. 1, the workload configured to execute on system resources 112/114 includes an operating system workload 116, a middleware workload 118, a database workload 120, and an application workload 122. Operating system workload 116 may be associated with any suitable operating system software including, but not limited to, Microsoft Windows OS, Mac OS, Linux OS (e.g., Ubuntu, Fedora, Redhat, Mint, etc.), and/or any other suitable operating systems. Middleware workload 118 may be associated with database middleware installed on a given database server, application server middleware installed on a given application server, and/or any other suitable middleware. Database workload 120 may include a set of SQL statements configured to execute on a given database server, and/or any other suitable database workload. Application workload 122 may include a set of tasks to be performed by the applications configured to execute on the application servers within computational environment 110. While illustrated in FIG. 1 as including operating system workload 116, middleware workload 118, database workload 120, and application workload 122, this disclosure contemplates that computational environment 110 may include any suitable computational workload configured to execute on the computational resources included within the system.

Figure 2A:
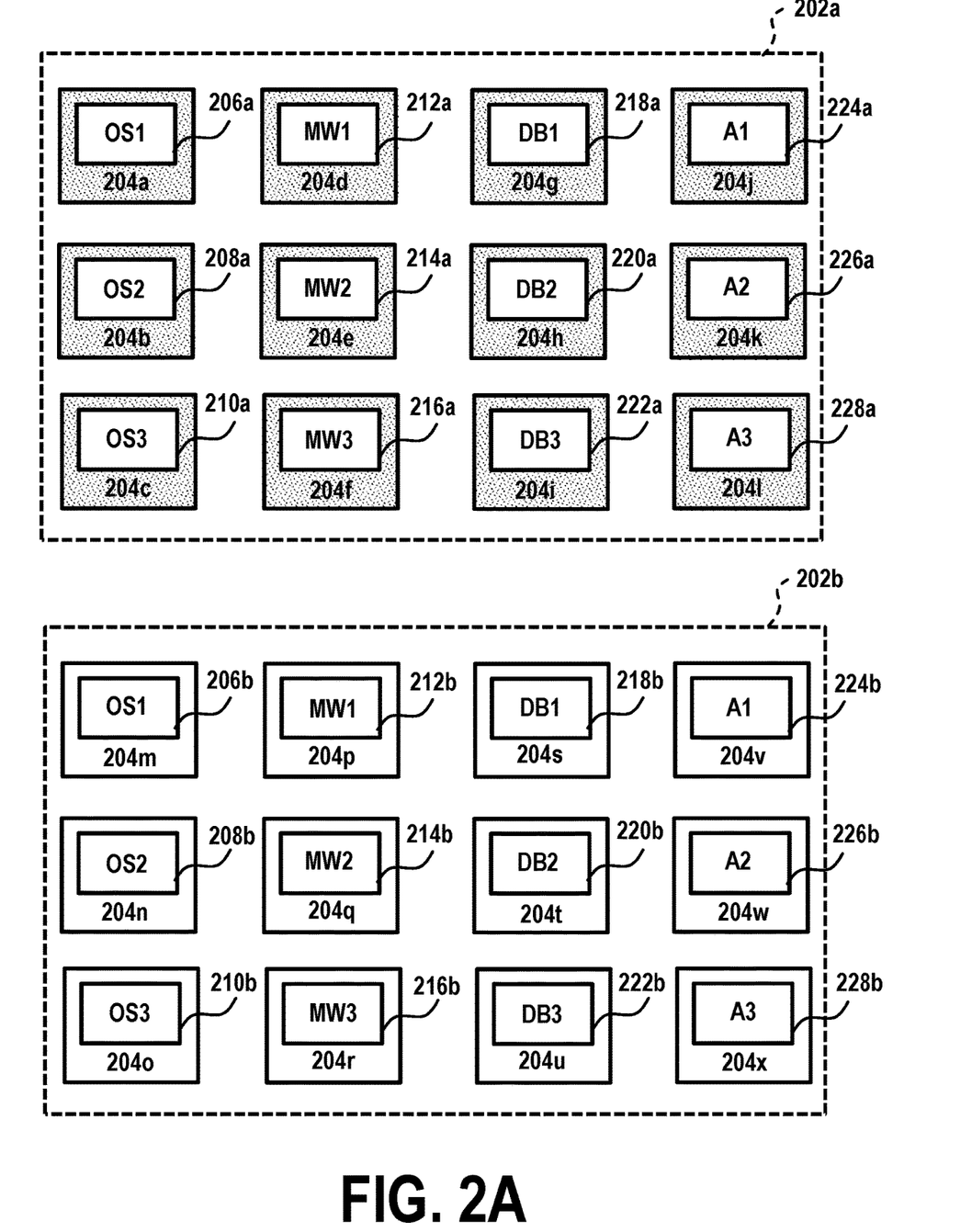
FIGS. 2A and 2B illustrate the manner by which the workload and computational resources of the system of FIG. 1 are divided into a set of independent execution units.

As described in further detail below, both the system resources 112/114 and computational workloads 116 through 122 of computational environment 110 may be divided into units of system resources (referred to throughout this disclosure as computational units) and workload units, respectively. Each computational unit corresponds to a portion of the system resources within the computational environment, and each workload unit corresponds to a portion of the workload executing within the computational environment. FIG. 2A illustrates an embodiment in which the computational resources of computational environment 110 have been divided into a set of twenty-four computational units 204a through 204x, and the workload of computational environment 110 has been divided into a set of 12 workload units 206 through 228 (illustrated in FIG. 2A as a first set of workload units 206a through 228a, and a second, redundant set of workload units 206b through 228b, the use of which is explained in detail below). Each workload unit 206a/b through 228a/b is assigned to at least one computational unit 204a through 204x, which is configured to execute the assigned workload unit. In this manner, performance metrics may be evaluated on a per computational unit basis. For instance, the CPU usage and memory usage of computational unit 204a may be obtained independently from the CPU usage and memory usage of computational unit 204d. In certain embodiments, each workload unit 206 is assigned one or more redundant computational units. For example, FIG. 2A illustrates an example in which each workload unit 206 is assigned to a primary computational unit (illustrated in FIG. 2A as workload units 206a through 228a executing on primary computational units 204a through 204l, and workload units 206b through 228b executing on redundant workload units 204m through 204x). Further details of the manner by which the computational resources 112/114 and workloads 116 through 122 of computational environment 110 are divided into units, and the use of such units for failure prediction and remediation are described below, in the discussion of FIGS. 2A/2B and 3-4.

Returning to FIG. 1, database 124 is any storage location within system 100 where remediation scripts 126 may be stored. For example, database 124 may correspond to a database, a server, a local storage system, an external storage system, cloud storage, and/or any other suitable storage location. Each remediation script 126a through 126n is associated with a known failure within computational environment 110. This disclosure contemplates that a known failure is any failure that (1) has previously occurred within computational environment 110; (2) has previously been predicted as likely to occur within computational environment 110; (3) has been recognized as potentially affecting computational environment 110; and/or (4) is similar enough to a failure of any of the preceding types, such that it makes sense to attempt to remediate it in the same manner. On the other hand, an unknown failure is any failure that cannot be classified as a known failure.

Each remediation script 126a through 126n is designed to prevent the associated known failure from occurring within computational environment 110. In particular, each remediation script 126a through 126n includes instructions that, when executed within computational environment 110, are configured to adjust computational environment 110 (e.g., dropping certain processes, restarting certain computational resources, etc.) so as to avoid the known failure.

As illustrated in FIG. 1, failure identification and prevention tool 102 includes processor 128 and memory 130. This disclosure contemplates processor 128 and memory 130 being configured to perform any of the functions of failure identification and prevention tool 102 described herein. Generally failure identification and prevention tool 102: (1) divides the computational resources (e.g., processing resources 112 and memory resources 114) of computational environment 110 into a set of computational units; (2) divides computational workloads 116 through 122 into a set of workload units; (3) assigns each workload unit to a primary computational unit and, in certain embodiments, to one or more redundant computational units; (4) measures performance metrics for each of the primary computational units and their assigned workload units; (5) predicts, based on the measured performance metrics, a probability that a failure will occur at a future time within the computational environment 110; (6) determines whether the predicted probability of a future failure is greater than a threshold; (7) in response to determining that the predicted probability of a future failure is greater than the threshold, predicts whether the future failure is a known failure, or an unknown failure; (8) in response to predicting that the future failure is a known failure, executes the remediation script 126 associated with the known failure; (9) in response to determining that the future failure is an unknown failure: (a) requests manual remediation through a remediation request 136 transmitted to a system administrator 104, or (b) attempts to automatically prevent the unknown failure, by generating and executing a sequence of resets within computational environment 110. The manner by which failure identification and prevention tool 102 performs these functions is described in detail below, in the discussion of FIGS. 2A/B, and 3-4.

Processor 128 is any electronic circuitry, including, but not limited to central processing units (CPUs), graphics processing units (GPUs), microprocessors, application specific integrated circuits (ASIC), application specific instruction set processor (ASIP), and/or state machines, that communicatively couples to memory 130 and controls the operation of failure identification and prevention tool 102. Processor 128 may be 8-bit, 16-bit, 32-bit, 64-bit or of any other suitable architecture. Processor 128 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 128 may include other hardware and software that operates to control and process information. Processor 128 executes software stored on memory 130 to perform any of the functions described herein. Processor 128 controls the operation and administration of failure identification and prevention tool 102 by processing information received from device(s) 106, network 108, computational environment 110, database 124, and/or memory 130. Processor 128 may be a programmable logic device, a microcontroller, a microprocessor, any suitable processing device, or any suitable combination of the preceding. Processor 128 is not limited to a single processing device and may encompass multiple processing devices.

Memory 130 may store, either permanently or temporarily, data, operational software, or other information/instructions 132 for processor 128. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 128 to perform one or more of the functions described herein.

In certain embodiments, memory 130 may also store one or more machine learning algorithms 134. For example, memory 130 may store a first machine learning algorithm 134a that is configured to predict, based on a set of performance metrics measured within the computational environment 110, a probability that a failure will occur within the computational environment within a future time. As an example, machine learning algorithm 134a may be configured to predict a probability of future failure based on a set of performance metrics that includes, for each computational unit actively executing a workload unit: (1) a performance metric associated with a usage of the processing resources (e.g., CPU usage) of the computational unit; (2) a performance metric associated with a memory usage (e.g., RAM usage) of the computational unit; (3) a performance metric associated with any error codes generated by the workload unit executing on the computational unit; (4) a performance metric associated with any page faults experienced by the computational unit; and/or (5) any other suitable performance metrics. In particular, in certain embodiments, machine learning algorithm 134a may be trained based on historical values for the performance metrics along with knowledge of any historical failures experienced by and/or expected for computational environment 110, to identify correlations between the values for the performance metrics and potential failures.

Machine learning algorithm 134a may be any suitable machine learning algorithm trained to predict potential system failures based on a set of performance metrics measured for each of the active computational units executing workload units within computational environment 110. As an example, in certain embodiments, machine learning algorithm 134a is a neural network.

Memory 130 may also store a second machine learning algorithm 134b that is configured to operate in conjunction with first machine learning algorithm 134a. In particular, in response to machine learning algorithm 134a predicting that a failure is likely to occur within computational environment 110, second machine learning algorithm 134b is configured to classify the potential failure as either one of a number of known failures, or an unknown failure. Machine learning algorithm 134b may classify the potential failure based on the values for the performance metrics measured for the set of computational units actively executing workload units within computational environment 110.

Machine learning algorithm 134b may include any machine learning algorithm trained to classify a potential failure as either one of a number of known failures, or an unknown failure. For example, machine learning algorithm 134a may be a neural network, a k-nearest neighbors algorithm, a decision tree algorithm, a naïve Bayes algorithm, a random forest algorithm, a gradient boosting algorithm, and/or any other suitable machine learning algorithm.

In certain embodiments, in response to classifying a potential failure as an unknown failure, machine learning algorithm 134b may be further configured to automatically generate remediation instructions for execution within computational environment 110. It may be desirable for failure identification and prevention tool 102 to attempt to automatically prevent an unknown failure from occurring within computational environment 110 rather than simply alerting a system administrator 104 to the potential failure, because it may take time from the system administrator to address the potential failure. During that time, the potential failure may occur within the system. Accordingly, any attempts to prevent the failure from occurring are likely preferable to inaction.

In certain embodiments, the remediation instructions generated by second machine learning algorithm 134b may take the form of a sequence of resets executed within computational environment 110. The manner in which machine learning algorithm 134b generates and executes the sequence of resets is described in further detail below, in the discussion of FIGS. 2A and 2B.

Second machine learning algorithm 134b may include any suitable machine learning algorithm configured to generate remediation instructions for execution within computational environment 110, based on values of a set of performance metrics measured for the active computational units executing within computational environment 110. As an example, in certain embodiments, machine learning algorithm 134b includes a reinforcement learning algorithm. For instance, in certain embodiments, reinforcement learning algorithm 142 is a deep Q reinforcement learning (DQN) algorithm, a double deep Q reinforcement learning (DDQN) algorithm, a deep deterministic policy gradient (DDPG) algorithm, and/or any other suitable reinforcement learning algorithm. The reinforcement learning algorithm may be trained to generate remediation instructions for execution within computational environment 110 in any suitable manner. For example, in certain embodiments, in response to first machine learning algorithm 134a predicting, based on values of a set of performance metrics measured for the active computational units executing within computational environment 110, that a probability that a potential failure will occur within computational environment 110 is greater than a given threshold, the reinforcement learning algorithm is configured to generate remediation instructions based on those performance metric values. Failure identification and prevention tool 102 may then measure new values for the set of performance metrics, and apply the first machine learning algorithm 134a to those new values, to determine a new probability that a potential failure will occur within computation environment 110. If the new probability is lower than the original probability, failure identification and prevention tool 102 may reward the reinforcement learning algorithm. On the other hand, if the new probability is greater than or equal to the original probability, failure identification and prevention tool 102 may punish the reinforcement learning algorithm.

Modifications, additions, or omissions may be made to the systems described herein without departing from the scope of the invention. For example, system 100 may include any number of users 104, devices 106, networks 108, computational environments 110, processing resources 112, memory resources 114, operating system workloads 116, middleware workloads 118, database workloads 120, application workloads 122, databases 124, remediation scripts 126, processors 128, memories 130, and/or machine learning algorithms 134a/b. The components may be integrated or separated. Moreover, the operations may be performed by more, fewer, or other components. Additionally, the operations may be performed using any suitable logic comprising software, hardware, and/or other logic.

II. Independent Execution Units

Figure 2B:
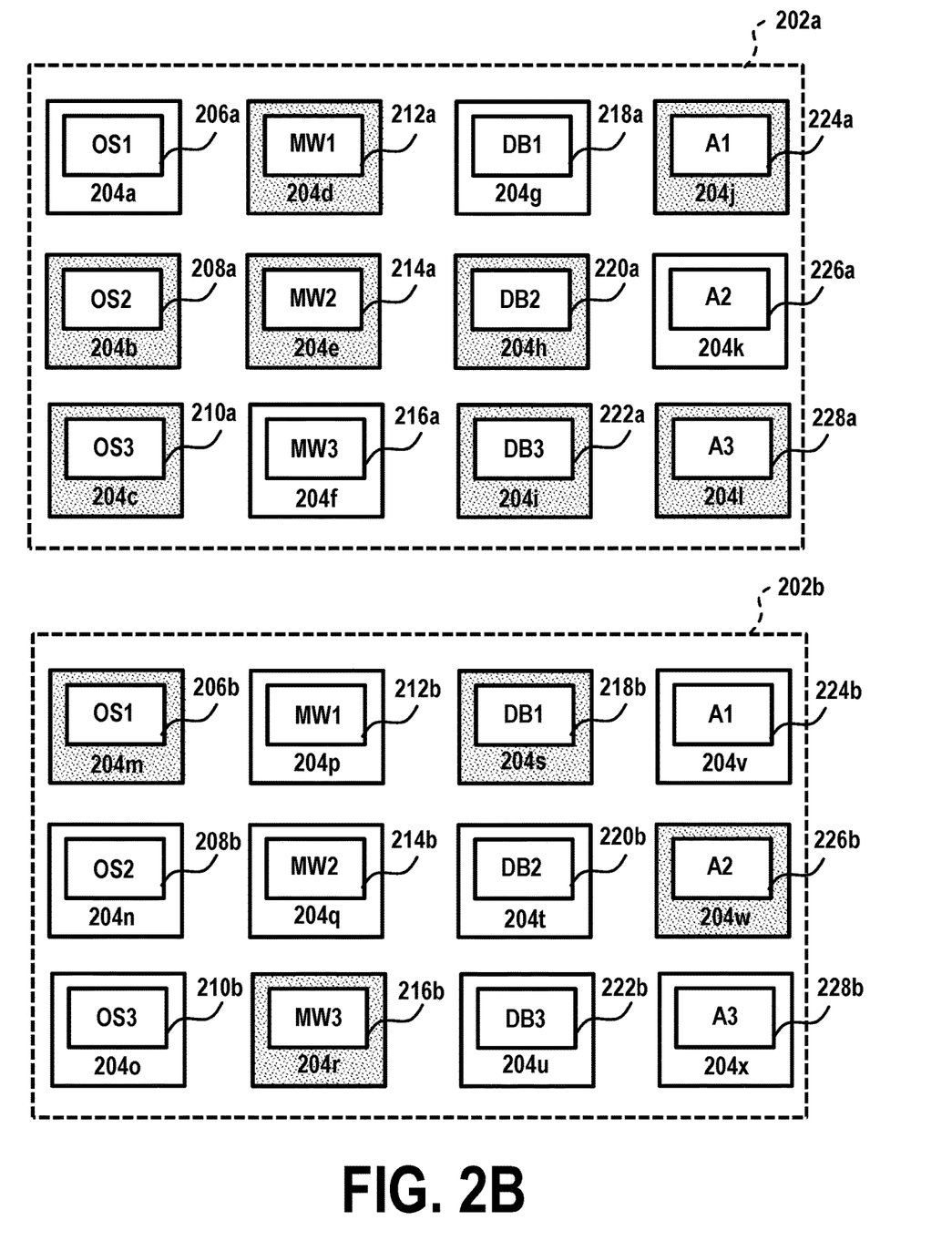

As explained above, failure identification and prevention tool 102 is configured to (1) divide the computation resources (e.g., processing resources 112 and memory resources 114) of computational environment 110 into a set of computational units; and (2) divide the workload executing within computational environment 110 (e.g., operating system workload 116, middleware workload 118, database workload 120, and application workload 122) into a set of workload units. FIGS. 2A and 2B present an example illustrating a set of computational units, each executing a workload unit, as an independent execution unit.

FIG. 2A illustrates, for simplicity, an example in which the computational resources of computational environment 110 have been divided into a set of twenty-four computational units 204a through 204x, and the computational workload to be executed within computational environment 110 has been divided into a set of 12 workload units 206 through 228. In particular, the operation system workload 116 has been divided into a set of three workload units 206 through 210, the middleware workload 118 has been divided into a set of three workload units 212 through 216, the database workload 120 has been divided into a set of three workload units 218 through 222, and the application workload 122 has been divided into a set of three workload units 224 through 228. As illustrated in FIG. 2A, the computational resources of computational environment 110 have been divided into twice as many units as has the workload to be executed within computational environment 110, providing a first level of redundancy for each workload unit. In particular, the computational resources within computational environment 110 have been divided into a primary set of computational units 202a and a redundant set of computational units 202b. As illustrate in FIG. 2A, for each workload unit 206 through 228, the primary set of computational units 202a includes computational units 204a through 204l, each of which is configured to actively execute a first copy 206a through 228a of a workload unit 206 through 228. Similarly, for each workload unit 206 through 228, the redundant set of computational units 202b includes computational units 204m through 204x, each of which is configured to passively execute a second copy 206b through 228b of a workload unit 206 through 228. While illustrated as a single level of redundancy in FIG. 2A, this disclosure contemplates that the computational resources of computational environment 110 may divided in any suitable manner, to provide any desired level of redundancy to the workload units 206 through 228. Furthermore, this disclosure contemplates that the workload executing within computational environment 110 may divided into any suitable number of workload units 206 through 228.

This disclosure contemplates that the redundancy provided by redundant computational units 204m through 204x may take any suitable form. As an example, in certain embodiments, both the active computational units 204a through 204l and the redundant computational units 204m through 204x are configured to execute their copies of workload units 206 through 228, but only the active computational units 204a through 204l are configured to generate results and/or serve user requests. As another example in some embodiments, only the active computational units 204a through 204l execute workload units 206 through 228, and such execution may, at any point, be transferred to a redundant computational unit 204m through 204x.

As explained above, in certain embodiments, second machine learning algorithm 134b is configured to automatically generate a set of remediation instructions, in an attempt to prevent a potential failure predicted by first machine learning algorithm 134a. In some such embodiments, the set of remediation instructions takes the form of a sequence of primary computational unit resets, to be executed within computational environment 110. As an example, a sequence of primary computational unit resets may include (1) a reset of computational unit 204a, executing workload unit 206a, (2) a reset of computation unit 204f, executing workload unit 216a, (3) a reset of computational unit 204g, executing workload unit 218a, and (4) a reset of computational unit 204k, executing workload unit 226a. During each primary computational unit reset, active execution of the associated workload unit is transferred to a corresponding redundant computational unit, execution of the workload unit is halted on the primary computational unit, and a reset is performed on the primary computational unit. In this manner, the primary computational unit and the redundant computational unit exchange roles. FIG. 2B illustrates an example in which active execution of workload unit 206 (illustrated in FIGS. 2A and 2B by shading of the computational unit) has been transferred from primary computational unit 204a to redundant computational unit 204m, active execution of workload unit 216 has been transferred from primary computational unit 204f to redundant computation unit 204r, active execution of workload unit 218 has been transferred from primary computational unit 204g to redundant computational unit 204s, and active execution of workload unit 226 has been transferred from primary computational unit 204k to redundant computational unit 204w.

This disclosure contemplates that second machine learning algorithm 134b may be configured to generate any suitable sequence of resets, which may be executed in any suitable order within computational environment 110. In certain embodiments, in response to generating a first sequence of resets and executing the first sequence of resets within computational environment 110, second machine learning algorithm 134b may be configured to generate a second series of resets to execute within the computational environment, based on the response of the computational environment to the first sequence of resets. For example, consider a situation in which the first machine learning algorithm 134a determines a probability P1 of potential failure, and second machine learning algorithm 134b generates a first sequence of resets that are executed within computational environment 110 in an attempt by failure identification and prevention tool 102 to prevent the potential failure from occurring within the computational environment. If, after executing the sequence of resets, failure identification and prevention tool 102 determines that the computational environment has improved (e.g., a new probability P2 of potential failure is less than the original probability P1 of potential failure), but that the potential failure is still likely, failure identification and prevention tool 102 may use second machine learning algorithm 134b to generate a second sequence of resets to perform within computational environment 110 to provide further improvement. This process may continue until the first machine learning algorithm 134a no longer predicts that a potential failure is likely to occur.

On the other hand, if, after executing the sequence of resets, failure identification and prevention tool 102 determines that the computational environment has not improved (e.g., a new probability P2 of potential failure is greater than or equal to the original probability P1), in certain embodiments, failure identification and prevention tool 102 may transmit an alert 136 to a system administrator, requesting manual remediation of the system. In some embodiments, failure identification and prevention tool 102 may be configured to generate a minimum number of sequences of resets prior to transmitting alert 136.

III. Automatic Execution of Remediation Scripts to Prevent Potential Failures

Figure 3:
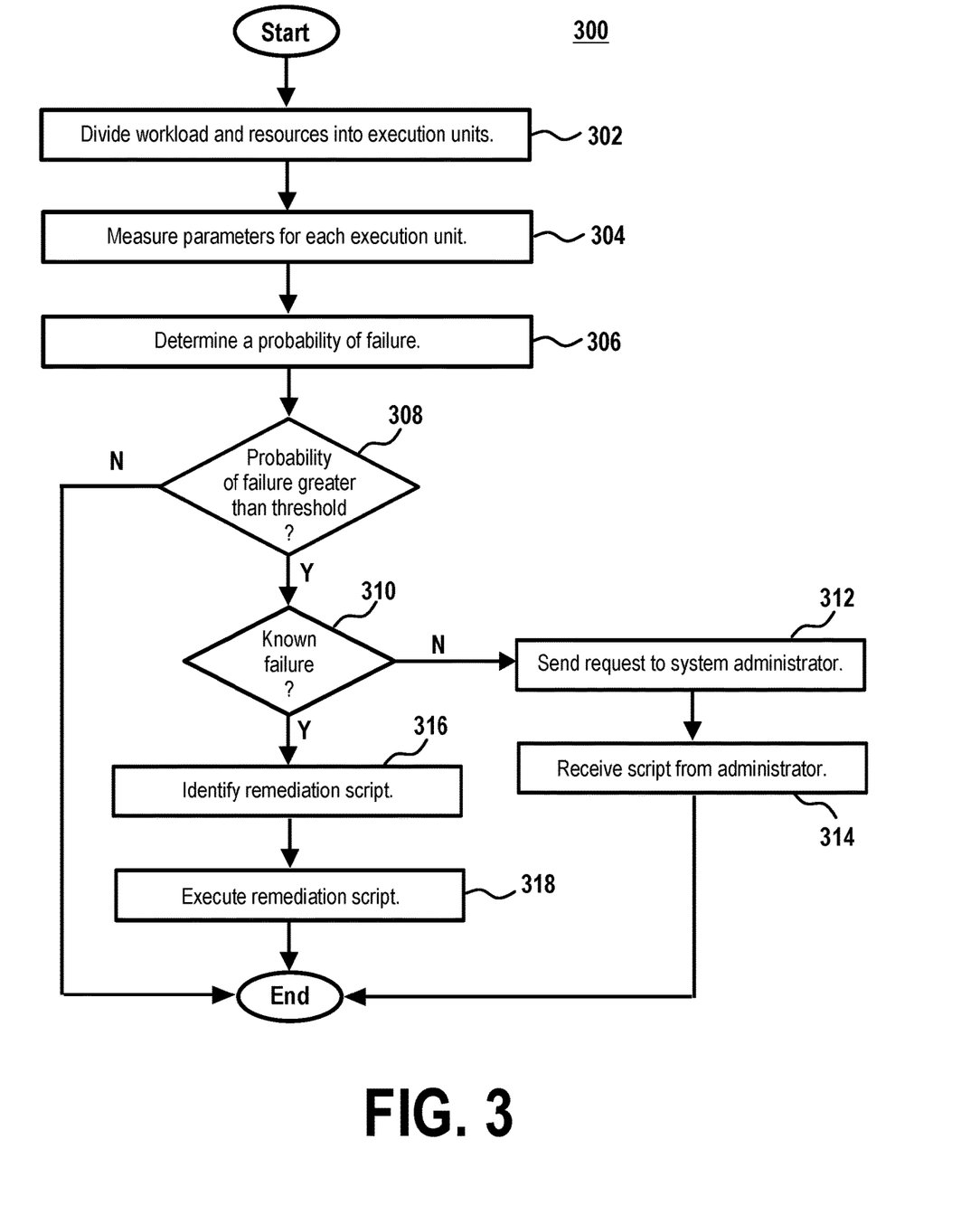
FIG. 3 presents a flowchart illustrating the manner by which the failure identification and prevention tool of the system of FIG. 1 identifies and prevents potential failures from occurring within the system.

FIG. 3 presents a flowchart illustrating an example method 300 (described in conjunction with elements of FIGS. 1 and 2) by which failure identification and prevention tool 102 automatically identifies potential failures within computational environment 110 and attempts to prevent the identified failures by automatically identifying and executing an appropriate remediation script 126.

During process 302 failure identification and prevention tool 102 divides the computational workload to be executed within computational environment 110 (e.g., operating system workload 116, middleware workload 118, database workload 120, and application workload 122) into a set of workload units 206 through 228. Failure identification and prevention tool 102 similarly divides the computational resources (e.g., processing resources 112 and memory resources 114) of computational environment 110 into a set of computational units 204a through 204x. Failure identification and prevention tool 102 the assigns each workload unit to a given computational unit. Each computational unit is configured to execute its assigned workload unit as an independent execution unit.

During process 304 failure identification and prevention tool 102 measures a set of performance metrics for each independent execution unit (e.g., workload unit execution on a computational unit). During process 306 failure identification and prevention tool 102 uses the measured performance metrics to predict a probability of a future failure within computational environment 110. For example, in certain embodiments, failure identification and prevention tool 102 applies machine learning algorithm 134a to the measured performance metrics to predict a probability of a future failure within computational environment 110. During process 308 failure identification and prevention tool 102 determines whether the probability of future failure is greater than a set threshold.

If, during process 308 failure identification and prevention tool 102 determines that the probability of a failure within computational environment 110 is greater than the set threshold, during process 310 failure identification and prevention tool 102 determines whether the predicted failure is a known failure or an unknown failure. For example, in certain embodiments, failure identification and prevention tool 102 applies machine learning algorithm 134b to the measured performance metrics to classify the potential failure as one of a number of known failures, or an unknown failure. If, during process 310 failure identification and prevention tool 102 determines that the potential failure is an unknown failure, during process 312 the tool transmits an alert 136 to a system administrator 104, requesting that the system administrator perform manual remediation of the potential failure. In certain embodiments, alert 136 includes values of the performance metrics measured by failure identification and prevention tool 102. During process 314 failure identification and prevention tool 102 may receive a remediation script 138 from system administrator 104, indicating that the system administrator has identified and remediated the known failure. Accordingly, failure identification and prevention tool 102 may store the new remediation script within database 124 and classify the previously unknown failure as a known failure that may be addressed using the new remediation script. In certain embodiments, failure identification and prevention tool 102 may additionally retrain machine learning algorithm 134a. For instance, failure identification and prevention tool 102 may include the newly identified potential failure as a new known failure of the set of known failures into which machine learning algorithm 134a is configured to classify a potential failure.

If, during process 310 failure identification and prevention tool 102 determines that the potential failure is a known failure, during process 316 the tool accesses database 124 and identifies the remediation script 126 that corresponds to the known failure. During process 318 failure identification and prevention tool 102 executes the remediation script within computational environment 110 to prevent the potential failure from occurring within the computational environment. Method 300 may be repeated any number of times within system 100.

Modifications, additions, or omissions may be made to method 300 depicted in FIG. 3. Method 300 may include more, fewer, or other steps. For example, steps may be performed in parallel or in any suitable order. While discussed as failure identification and prevention tool 102 (or components thereof) performing certain steps, any suitable components of system 100, including, for example, device 106, may perform one or more steps of the method.

IV. Automatic Remediation of Unknown Potential Failures

Figure 4:
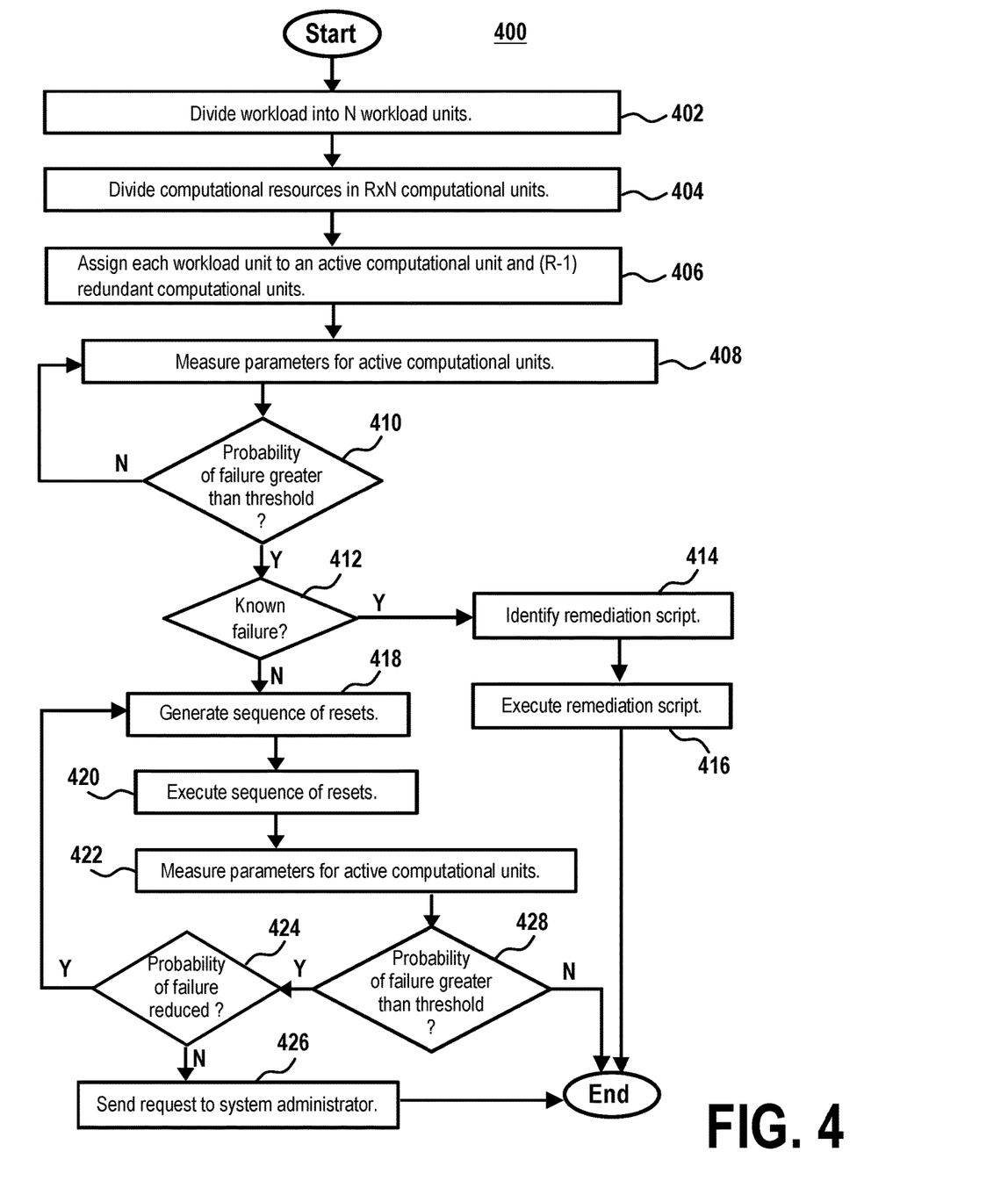
FIG. 4 presents a flowchart illustrating the manner by which the failure identification and prevention tool of the system of FIG. 1 attempts to automatically prevent an unknown potential failure within the system by executing resets within the execution units illustrated in FIGS. 2A and 2B.

FIG. 4 presents a flowchart illustrating an example method 400 (described in conjunction with elements of FIGS. 1 and 2) by which failure identification and prevention tool 102 automatically identifies potential failures within computational environment 110 and attempts to prevents to automatically remediate the identified failures.

During process 402 failure identification and prevention tool 102 divides the computational workload to be executed within computational environment 110 (e.g., operating system workload 116, middleware workload 118, database workload 120, application workload 122, etc.) into a set of N workload units. During process 404 failure identification and prevention tool 102 divides the computational resources (e.g., processing resources 112 and memory resources 114) of computation environment 110 into a set of N×R computational units, where N is the number of workload units, and R is the desired redundancy level. In particular, failure identification and prevention tool 102 divides the computational resources into a set of active computational units 202a, and (R−1) sets of redundant computational units 202b. During process 406 failure identification and prevention tool 102 assigns each workload unit to an active computational unit and to (R−1) redundant computational units. During process 408 failure identification and prevention tool 102 measures a set of performance metrics for each active computational unit.

During process 410 failure identification and prevention tool 102 determines, based on the measured values for the performance metrics, whether a potential failure is likely to occur within computational environment 110. For example, in certain embodiments, failure identification and prevention tool 102 applies a machine learning algorithm 134a to the measured values for the performance metrics to determine a probability of a potential failure within computational environment 110, and compares that probability to a set threshold. If the probability is greater than the set threshold, failure identification and prevention tool 102 determines that the potential failure is likely to occur. If, during process 410 failure identification and prevention tool 102 determines that a potential failure is not likely to occur, method 400 returns to process 408, where the tool continues to monitor computational environment 110 by measuring performance metrics.

If, during process 410 failure identification and prevention tool 102 determines that a potential failure is likely to occur within computational environment 110, during process 412 failure identification and prevention tool 102 next determines whether the predicted failure is a known failure of a number of known failures, or an unknown failure. For example, in certain embodiments, failure identification and prevention tool 102 applies machine learning algorithm 134b to the measured performance metrics to classify the potential failure as one of a number of known failures, or an unknown failure. If, during process 412 failure identification and prevention tool 102 determines that the potential failure is a known failure, during process 414 the tool accesses database 124 and identifies the remediation script 126 that corresponds to the known failure. During process 416 failure identification and prevention tool 102 executes the remediation script within computational environment 110 to prevent the potential failure from occurring within the computational environment.

If, during process 412 failure identification and prevention tool 102 determines that the potential failure is an unknown failure, during process 418 the tool applies second machine learning algorithm 134b to the values of the performance metrics, to generate a sequence of resets to execute within computational environment 110. As explained above, in the discussion of FIGS. 2A and 2B, each reset is associated with a given workload unit executing within computational environment 110, and corresponds to a transfer of active execution of the given workload unit from an active computational unit to a redundant computational unit, followed by a reset of the active computational unit. During process 420 failure identification and prevention tool 102 executes the sequence of resets within computational environment 110.

During process 422 failure identification and prevention tool 102 measures new values of the performance metrics for the set of active computational units (e.g., those computational units actively executing workload units, which may include formerly redundant computational units that have been converted into active computational units through execution of a reset within computational environment 110). During process 428 failure identification and prevention tool 102 applies machine learning algorithm 134a to the new values of the performance metrics to determine a new probability that a failure will occur within the computational environment, and determines whether the new probability is greater than the set threshold. If, during process 428 failure identification and prevention tool 102 determines that the new probability is not greater than the set threshold, in certain embodiments, the tool rewards machine learning algorithm 134b.

If, during process 428 failure identification and prevention tool 102 determines that the new probability is greater than the set threshold, during process 424 failure identification and prevention tool 102 determines whether the new probability is lower than the previously determined probability. If, during process 424 failure identification and prevention tool 102 determines that the new probability is lower than the previously determined probability, in certain embodiments, failure identification and prevention tool 102 rewards machine learning algorithm 134b, and method 400 returns to process 418, during which failure identification and prevention tool 102 generates a new sequence of resets.

If, during process 424 failure identification and prevention tool 102 determines that the new probability is greater than or equal to the previously determined probability, in certain embodiments, failure identification and prevention tool 102 punishes machine learning algorithm 134b. During process 426 failure identification and prevention tool 102 transmits a request 136 to a system administrator 104 requesting that the system administrator manually address the potential failure.

Modifications, additions, or omissions may be made to method 400 depicted in FIG. 4. Method 400 may include more, fewer, or other steps. For example, steps may be performed in parallel or in any suitable order. While discussed as failure identification and prevention tool 102 (or components thereof) performing certain steps, any suitable components of system 100, including, for example, device 106, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system comprising:
    a computer system comprising system resources, the computer system configured to execute a workload, the workload divided into a plurality of workload units, the system resources comprising a plurality of units of system resources comprising:
        a plurality of active units of system resources, each workload unit of the plurality of workload units assigned to an active unit of system resources of the plurality of active units of system resources, the assigned active unit of system resources configured to execute the workload unit; and
        a plurality of redundant units of system resources, each redundant unit of system resources of the plurality of redundant units of system resources assigned to an active unit of system resources of the plurality of active units of system resources;
    a memory configured to store a reinforcement learning algorithm configured to generate a sequence of resets for execution within the computer system, based on values for a set of performance metrics associated with the computer system, each reset of the sequence of resets associated with a particular workload unit executing on a given active unit of system resources of the plurality of active units of system resources, wherein:
        executing the reset comprises exchanging the given active unit of system resources with the redundant unit of system resources assigned to the given active unit of system resources, at least in part by transferring active execution of the particular workload unit from the given active unit of system resources to the redundant unit of system resources assigned to the given active unit of system resources; and
        for each active unit of system resources of the plurality of active units of system resources, the set of performance metrics comprises one or more metrics associated with a performance of the active unit of system resources and one or more metrics associated with a performance of the workload unit executing on the active unit of system resources;
a hardware processor communicatively coupled to the memory, the hardware processor configured to:
measure the values for the set of performance metrics associated with the computer system;
determine, based on the values for the set of performance metrics, that a first probability that a first failure within the computer system will occur within a first future time is greater than a set threshold; and
in response to determining that the first probability is greater than the set threshold:
execute the reinforcement learning algorithm to generate the sequence of resets for the computer system;
execute each reset of the sequence of resets;
measure new values for the set of performance metrics associated with the computer system;
determine, based on the new values for the set of performance metrics, a second probability that the first failure within the computer system will occur within the first future time; and
update the reinforcement learning algorithm based on a difference between the first probability and the second probability.

2. The system of claim 1, wherein:
the second probability is greater than the first probability; and
updating the reinforcement learning algorithm based on the difference between the first probability and the second probability comprises providing the reinforcement learning algorithm with a punishment value.

3. The system of claim 1, wherein:
the second probability is less than the first probability; and
updating the reinforcement learning algorithm based on the difference between the first probability and the second probability comprises providing the reinforcement learning algorithm with a reward value.

4. The system of claim 1, wherein:
the workload comprises:
an operating system component divided into a plurality of operating system units;
a middleware component divided into a plurality of middleware units; and
an application component divided into a plurality of application units; and
the plurality of workload units comprises the plurality of operating system units, the plurality of middleware units, and the plurality of application units.

5. The system of claim 1, wherein:
the second probability is greater than the first probability; and
in response to determining that the second probability is greater than the first probability, the hardware processor is further configured to transmit a request for manual remediation to a system administrator.

6. The system of claim 1, wherein:
the plurality of units of system resources further comprises a second plurality of redundant units of system resources, each redundant unit of system resources of the second plurality of redundant units of system resources assigned to an active unit of system resources of the plurality of active units of system resources;
the reinforcement learning algorithm is further configured to generate a second sequence of resets for execution within the computer system, each reset of the second sequence of resets associated with a particular workload unit executing on a given active unit of system resources of the plurality of active units of system resources, wherein:
executing the reset comprises exchanging the given active unit of system resources with at least one of the redundant unit of system resources of the plurality of redundant units of system resources assigned to the given active unit of system resources and the redundant unit of system resources of the second plurality of redundant units of system resources assigned to the given active unit of system resources; and
the hardware processor is further configured to:
execute the reinforcement learning algorithm to generate the second sequence of resets; and
execute each reset of the second sequence of resets.

7. The system of claim 1, wherein:
each unit of system resources of the plurality of units of system resources comprises at least one of a unit of processing resources and a unit of memory resources; and
for each unit of system resources of the plurality of units of system resources:
the one or more metrics associated with the performance of the unit of system resources comprises at least one of:
a metric associated with a CPU usage of the unit of system resources; and
a metric associated with a memory usage of the unit of system resources; and
the one or more metrics associated with the performance of the workload unit executing on the unit of system resources comprises at least one of:
a metric associated with any exceptions generated by the workload unit executing on the unit of system resources; and
a metric associated with any error codes generated by the workload unit executing on the unit of system resources.

8. A method comprising:
dividing a workload into a plurality of workload units;
dividing a computer system comprising computational resources configured to execute the workload into a plurality of units of system resources, the plurality of units of system resources comprising:
a plurality of active units of system resources; and
a plurality of redundant units of system resources;
assigning each workload unit of the plurality of workload units to a first active unit of system resources of the plurality of active units of system resources, the first active unit of system resources configured to execute the workload unit;
assigning each redundant unit of system resources of the plurality of redundant units of system resources to a second active unit of system resources of the plurality of active units of system resources, the assigned redundant unit of system resources configured to provide redundant system resources for the second active unit of system resources;
for each workload unit of the plurality of workload units, executing the workload unit on the first active unit of system resources;
measuring values for a set of performance metrics associated with the computer system, wherein for each active unit of system resources of the plurality of active units of system resources, the set of performance metrics comprises one or more metrics associated with a performance of the corresponding active unit of system resources and one or more metrics associated with a performance of the workload unit executing on the corresponding active unit of system resources;

determining, based on the values for the set of performance metrics, that a first probability that a first failure within the computer system will occur within a first future time is greater than a set threshold; and in response to determining that the first probability is greater than the set threshold:
  executing a reinforcement learning algorithm to generate a sequence of resets for the computer system, wherein:
    the reinforcement learning algorithm is configured to generate the sequence of resets for execution within the computer system, based on values for a set of performance metrics associated with the computer system;
    each reset of the sequence of resets is associated with a particular workload unit executing on a given active unit of system resources of the plurality of active units of system resources, wherein executing the reset comprises exchanging the given active unit of system resources with the redundant unit of system resources assigned to the given active unit of system resources, at least in part by transferring active execution of the particular workload unit from the given active unit of system resources to the redundant unit of system resources assigned to the given active unit of system resources
  executing each reset of the sequence of resets;
  measuring new values for the set of performance metrics associated with the computer system;
  determining, based on the new values for the set of performance metrics, a second probability that the first failure within the computer system will occur within the first future time; and
updating the reinforcement learning algorithm based on a difference between the first probability and the second probability.

9. The method of claim 8, wherein:
the second probability is greater than the first probability; and
updating the reinforcement learning algorithm based on the difference between the first probability and the second probability comprises providing the reinforcement learning algorithm with a punishment value.

10. The method of claim 8, wherein:
the second probability is less than the first probability; and
updating the reinforcement learning algorithm based on the difference between the first probability and the second probability comprises providing the reinforcement learning algorithm with a reward value.

11. The method of claim 8, wherein:
the workload comprises:
  an operating system component divided into a plurality of operating system units;
  a middleware component divided into a plurality of middleware units; and
  an application component divided into a plurality of application units; and
the plurality of workload units comprises the plurality of operating system units, the plurality of middleware units, and the plurality of application units.

12. The method of claim 8, wherein:
the second probability is greater than the first probability; and
in response to determining that the second probability is greater than the first probability, the method further comprising transmitting a request for manual remediation to a system administrator.

13. The method of claim 8, wherein:
the plurality of units of system resources further comprises a second plurality of redundant units of system resources, each redundant unit of system resources of the second plurality of redundant units of system resources assigned to a third active unit of system resources of the plurality of active units of system resources;
the reinforcement learning algorithm is further configured to generate a second sequence of resets for execution within the computer system, each reset of the second sequence of resets associated with a particular workload unit executing on a given active unit of system resources of the plurality of active units of system resources, wherein:
  executing the reset comprises exchanging the given active unit of system resources with at least one of the redundant unit of system resources of the plurality of redundant units of system resources assigned to the given active unit of system resources and the redundant unit of system resources of the second plurality of redundant units of system resources assigned to the given active unit of system resources; and
the method further comprises:
  executing the reinforcement learning algorithm to generate the second sequence of resets; and
  executing each reset of the second sequence of resets.

14. The method of claim 8, wherein:
each unit of system resources of the plurality of units of system resources comprises at least one of a unit of processing resources and a unit of memory resources; and
for each unit of system resources of the plurality of units of system resources:
  the one or more metrics associated with the performance of the unit of system resources comprises at least one of:
    a metric associated with a CPU usage of the unit of system resources; and
    a metric associated with a memory usage of the unit of system resources; and
  the one or more metrics associated with the performance of the workload unit executing on the unit of system resources comprises at least one of:
    a metric associated with any exceptions generated by the workload unit executing on the unit of system resources; and
    a metric associated with any error codes generated by the workload unit executing on the unit of system resources.

15. A non-transitory computer-readable medium comprising instructions that, when executed by a hardware processor, cause the processor to:
divide a workload into a plurality of workload units;
divide a computer system comprising system resources configured to execute the workload into a plurality of units of system resources, the plurality of units of system resources comprising:

a plurality of active units of system resources; and
a plurality of redundant units of system resources;
assign each workload unit of the plurality of workload units to a first active unit of system resources of the plurality of active units of system resources, the first active unit of system resources configured to execute the workload unit;
assign each redundant unit of system resources of the plurality of redundant units of system resources to a second active unit of system resources of the plurality of active units of system resources;
for each workload unit of the plurality of workload units, execute the workload unit on the first assigned active unit of system resources;
measure values for a set of performance metrics associated with the computer system, wherein for each active unit of system resources of the plurality of active units of system resources, the set of performance metrics comprises one or more metrics associated with a performance of the corresponding active unit of system resources and one or more metrics associated with a performance of the workload unit executing on the corresponding active unit of system resources;
determine, based on the values for the set of performance metrics, that a first probability that a first failure within the computer system will occur within a first future time is greater than a set threshold; and
in response to determining that the first probability is greater than the set threshold:
execute a reinforcement learning algorithm to generate a sequence of resets for the computer system, wherein:
the reinforcement learning algorithm is configured to generate the sequence of resets for execution within the computer system, based on values for a set of performance metrics associated with the computer system;
each reset of the sequence of resets is associated with a particular workload unit executing on a given active unit of system resources of the plurality of active units of system resources, wherein executing the reset comprises exchanging the given active unit of system resources with the redundant unit of system resources assigned to the given active unit of system resources, at least in part by transferring active execution of the particular workload unit from the given active unit of system resources to the redundant unit of system resources assigned to the given active unit of system resources;
execute each reset of the sequence of resets;
measure new values for the set of performance metrics associated with the computer system;
determine, based on the new values for the set of performance metrics, a second probability that the first failure within the computer system will occur within the first future time; and
update the reinforcement learning algorithm based on a difference between the first probability and the second probability.

16. The non-transitory computer-readable medium of claim 15, wherein:
the second probability is greater than the first probability; and
updating the reinforcement learning algorithm based on the difference between the first probability and the second probability comprises providing the reinforcement learning algorithm with a punishment value.

17. The non-transitory computer-readable medium of claim 15, wherein:
the second probability is less than the first probability; and
updating the reinforcement learning algorithm based on the difference between the first probability and the second probability comprises providing the reinforcement learning algorithm with a reward value.

18. The non-transitory computer-readable medium of claim 15, wherein:
the workload comprises:
an operating system component divided into a plurality of operating system units;
a middleware component divided into a plurality of middleware units; and
an application component divided into a plurality of application units; and
the plurality of workload units comprises the plurality of operating system units, the plurality of middleware units, and the plurality of application units.

19. The non-transitory computer-readable medium of claim 15, wherein:
the second probability is greater than the first probability; and
in response to determining that the second probability is greater than the first probability, the hardware processor is further configured to transmit a request for manual remediation to a system administrator.

20. The non-transitory computer-readable medium of claim 15, wherein:
the plurality of units of system resources further comprises a second plurality of redundant units of system resources, each redundant unit of system resources of the second plurality of redundant units of system resources assigned to a third active unit of system resources of the plurality of active units of system resources;
the reinforcement learning algorithm is further configured to generate a second sequence of resets for execution within the computer system, each reset of the second sequence of resets associated with a particular workload unit executing on a given active unit of system resources of the plurality of active units of system resources, wherein:
executing the reset comprises exchanging the given active unit of system resources with at least one of the redundant unit of system resources of the plurality of redundant units of system resources assigned to the given active unit of system resources and the redundant unit of system resources of the second plurality of redundant units of system resources assigned to the given active unit of system resources; and
the instructions, when executed by the hardware processor, further cause the processor to:
execute the reinforcement learning algorithm to generate the second sequence of resets; and
execute each reset of the second sequence of resets.

\* \* \* \* \*